No. 743,338. Patented November 3, 1903.

UNITED STATES PATENT OFFICE.

FRANZ SCHERHAG, OF VIENNA, AUSTRIA-HUNGARY.

COLORING GLASS OR GLASSWARE.

SPECIFICATION forming part of Letters Patent No. 743,338, dated November 3, 1903.

Application filed June 15, 1901. Serial No. 64,696. (No specimens.)

*To all whom it may concern:*

Be it known that I, FRANZ SCHERHAG, artist, painter, a subject of the Emperor of Austria-Hungary, residing in Mariahilferstrasse No. 170, Vienna XV, Austria-Hungary, have invented Improvements in Coloring of Glass or Glassware; and I do hereby declare the following to be a full, clear, and exact description of the invention, such as will enable others skilled in the art to which it appertains to make and use the same.

This invention relates to the coloring of glass or glassware. While in the methods heretofore known glass was usually colored in the bulk or by flashing—that is to say, coating with a mass of colored glass—the object of this invention is to color glass plates or other finished articles of glassware. This invention, which possesses various advantages above the methods heretofore known, consists in treating the glass plates or articles of glassware in the manner more fully hereinafter described.

According to my improved method the plate or other article of glass is first carefully cleaned, preferably with beer, chalk, or other equivalent material, and is then rubbed off with a piece of cloth dipped into a ten or twelve per cent. solution of iodin. I then apply a ground, preferably of some waterproof material, the object being to thereby cause the coal-tar colors to adhere properly to the glass. For the ground I may, according to the varying conditions or objects in view, employ different materials, as will be more fully explained hereinafter. It may, however, be here remarked that I previously heat the glass plate at a temperature of from 50° to 60° centigrade and spread the ground-coating thereon evenly, whereupon I then allow the same to dry during from six to eight hours.

According to the character of the material used for the ground I employ for the subsequent coloring such coal-tar colors as are soluble in water or fat and I apply the coloring by pouring the same over the glass plate or, preferably, by immersing the latter in a vat containing color. Citric acid (about one per cent.) may be added to any of the colors employed with the exception of red colors. After the color has become thoroughly dry I bind the same by using a suitable balsam or varnish capable of resisting high temperatures. Copaiva or Canada balsam has been found well suited for this purpose. This balsam is carefully and evenly spread over the glass plate with a brush and is ultimately allowed to dry at a temperature of preferably from 130° to 380° centigrade. If it is desired merely to make the color resistible against the heat of lamps or against the action of fuming muriatic acid, hydrofluoric acid, lye, and the like, then a temperature of from 90° to 100° centigrade will be found sufficient. I may also mix the color at once with the ground material in quantities depending upon the particular hue to be thus imparted to the same, so that in this case nothing more is required after the drying process than to bind the color thus applied.

Articles of glass may be dipped into the liquid grounding material and into the color or into a mixture of both, as the case may be. Various materials may be used for the ground, according to the object in view. Thus for glass plates which have not yet been given any particular dimensions and which are intended for being cut up into smaller pieces I preferably employ for the ground a four-per-cent. collodion solution, which I apply either by itself or mixed with any color desired by means of a brush to the glass plate after having previously heated the latter. The collodion solution, as is well known, will resist the action of water, and thus by thoroughly and uniformly coating the glass plate with such solution I prevent the ground from becoming loose or the color washing off, as would otherwise occur in certain places, particularly at the edges of the glass plates. For glass plates already cut to size it will be sufficient to apply a four-per-cent. collodion solution thereto at the edges, so as to extend to about three-quarters of an inch from the edges, whereas the remaining surface is coated with a less expensive solution, consisting of about one thousand parts, by weight, of water, about two hundred and twenty-five parts, by weight, of gelatin or glue, about seventy-five parts, by weight, of animal gluten, about twenty-two parts, by weight, of oxalic acid, about five-tenths part, by weight, of chrome-ammonium, and about eight parts, by weight, of acetic acid.

In the above mixture the water serves as the solvent for the gelatin or glue and for the animal gluten, which latter substance is employed in order to thereby increase the elasticity of the mass, and in this effect it is materially assisted by the acetic or any other acid. In place of oxalic acid, which imparts to the mass a certain degree of hardness, I may also in some cases use any other suitable tanning material. The chrome-ammonium, in the place of which any known equivalent may be substituted, renders the ground material better capable of resisting the action of water.

The ingredients above named are boiled, preferably in a receptacle of porcelain. They are then filtered, and after having become thoroughly dissolved they are brushed or poured onto the plate of glass at a temperature of about 75° centigrade, more or less.

In some cases I may also employ as a ground for glasses a solution of india-rubber—for instance, a solution of four parts of natural india-rubber in one hundred parts of benzin. This ground mass is particularly well suited for the manufacture of glasses which are intended to have an actinic effect, such as are preferably employed in the photographic art, on account of their quality of being insensitive to certain white rays of light.

Glass or glass articles colored by my improved method are quite clear and transparent. At the same time they will resist the action of temperatures up to 250° centigrade and will neither be attacked by fuming muriatic acid nor hydrofluoric acid.

Having now particularly described and ascertained the nature of my said invention and in what manner the same is to be performed, I declare that what I claim is—

The method of coloring glass or articles of glassware which consists in cleaning, heating and subsequently covering the same with a ground coating containing collodion, then applying thereto, as described, a uniform coating of a suitable coal-tar color which is soluble in water or fat, allowing the same to dry, and finally binding the said color by a balsam or varnish adapted to resist high temperatures, substantially as and for the purpose described.

In testimony that I claim the foregoing I have hereunto set my hand this 28th day of May, 1901.

FRANZ SCHERHAG.

Witnesses:
HENRY BELMONT,
ALVESTO S. HOGUE.